United States Patent
Bhatnagar et al.

(10) Patent No.: US 11,429,455 B2
(45) Date of Patent: Aug. 30, 2022

(54) GENERATING PREDICTIONS FOR HOST MACHINE DEPLOYMENTS

(71) Applicant: VMWARE, INC., Palo Alto, CA (US)

(72) Inventors: Yash Bhatnagar, Bangalore (IN); Naina Verma, Bangalore (IN); Mageshwaran Rajendran, Bangalore (IN); Amit Kumar, Bangalore (IN); Venkata Naga Manohar Kondamudi, Bangalore (IN)

(73) Assignee: VMware, Inc., Palo Alto, CA (US)

(*) Notice: Subject to any disclaimer, the term of this patent is extended or adjusted under 35 U.S.C. 154(b) by 255 days.

(21) Appl. No.: 16/910,115

(22) Filed: Jun. 24, 2020

(65) Prior Publication Data

US 2021/0342199 A1 Nov. 4, 2021

(30) Foreign Application Priority Data

Apr. 29, 2020 (IN) .............................. 202041018317

(51) Int. Cl.
*G06F 9/50* (2006.01)
*G06N 5/04* (2006.01)
*H04L 41/147* (2022.01)
*G06N 20/00* (2019.01)
*H04L 67/10* (2022.01)

(52) U.S. Cl.
CPC ............ *G06F 9/5083* (2013.01); *G06F 9/505* (2013.01); *G06N 5/04* (2013.01); *G06N 20/00* (2019.01); *H04L 41/147* (2013.01); *H04L 67/10* (2013.01)

(58) Field of Classification Search
CPC ................. G06F 9/5083; G06F 9/505; G06F 2209/5019; G06F 9/5061; G06N 5/04; G06N 20/00; G06N 20/10; H04L 41/147; H04L 67/10; H04L 41/142; H04L 41/145; H04L 41/0896; H04L 43/0876
See application file for complete search history.

(56) References Cited

U.S. PATENT DOCUMENTS

| | | | |
|---|---|---|---|
| 10,095,533 B1* | 10/2018 | Dravid | G06F 9/5088 |
| 11,194,628 B2* | 12/2021 | Reyes | G06F 11/3433 |
| 2012/0011590 A1* | 1/2012 | Donovan | H04L 63/1408 726/25 |
| 2013/0086268 A1* | 4/2013 | Sloma | G06F 9/455 709/226 |
| 2016/0357610 A1* | 12/2016 | Bartfai-Walcott | G06F 9/5027 |
| 2017/0046247 A1* | 2/2017 | Nutter | G06F 11/3684 |
| 2017/0295108 A1* | 10/2017 | Mahindru | H04L 47/70 |
| 2017/0344400 A1* | 11/2017 | Birke | G06F 9/45558 |
| 2018/0246751 A1* | 8/2018 | Dong | G06F 9/45558 |
| 2018/0293120 A1* | 10/2018 | Arora | G06F 11/3051 |
| 2020/0184026 A1* | 6/2020 | Espino | G06F 16/9024 |
| 2021/0157694 A1* | 5/2021 | Dye | G06F 11/3006 |

* cited by examiner

*Primary Examiner* — Jorge A Chu Joy-Davila
(74) *Attorney, Agent, or Firm* — Thomas | Horstemeyer LLP

(57) ABSTRACT

Disclosed are various embodiments for generating recommended replacement host machines for a datacenter. The recommendations can be generated based upon an analysis of historical workload usage across the datacenter. Clusters can be generated that cluster workloads together that are similar. Purchase plans can be generated based upon the identified clusters and benchmark data regarding servers.

18 Claims, 7 Drawing Sheets

GENERATING PREDICTIONS FOR HOST MACHINE DEPLOYMENTS

RELATED APPLICATIONS

Benefit is claimed under 35 U.S.C. 119(a)-(d) to Foreign application Serial No. 202041018317 filed in India entitled "GENERATING PREDICTIONS FOR HOST MACHINE DEPLOYMENTS", on Apr. 29, 2020, by VMware, Inc., which is herein incorporated in its entirety by reference for all purposes.

BACKGROUND

Enterprises can employ datacenters in order to provide compute, memory, storage, network, and other resources for enterprise workloads. The workloads, which can be embodied in applications or virtual machines, can represent demands for the datacenter. Capacity for the datacenter is based on the physical host machines, or hosts, that provide resources. The hosts can include CPU, memory, storage, network, and other resources that are utilized for the enterprise workloads.

Capacity planning is a challenging problem that datacenter administrators or managers face in their day to day jobs. The administrator can add and remove demands as well as add and remove capacity for the datacenter. Commonly, an administrator is on a periodic purchase cycle to add hosts to the datacenter, such as a yearly purchase cycle. However, the administrator must also plan for growth in resource demands from workloads that are deployed across the hosts. Additionally, the administrator must also plan for the fact that certain hosts may reach end of life by the next purchase cycle and should be replaced. Additionally, the administrator must weigh cost and match workloads to appropriate hosts based upon the resources provided by server options in the market. Resource requirement calculations are often predictive and can be inaccurate or misleading based on the assumptions made in resource calculations. Existing solutions can utilize the current capacity and current workloads to identify whether the capacity is sufficient for current workloads.

Accordingly, more accurate capacity planning technologies are needed. More accurate capacity planning technologies are more efficient for administrators to use, as they will not have to update capacity as frequently when predicted capacity is accurate.

BRIEF DESCRIPTION OF THE DRAWINGS

Many aspects of the present disclosure can be better understood with reference to the following drawings. The components in the drawings are not necessarily to scale, with emphasis instead being placed on clearly illustrating the principles of the disclosure. Moreover, in the drawings, like reference numerals designate corresponding parts throughout the several views.

DETAILED DESCRIPTION

Disclosed are various approaches for generating predictions for inventory refreshing of a server inventory in a datacenter. A datacenter can be a private datacenter that is on an enterprise premises or one that is managed by a third party on behalf of a datacenter. Datacenters include various host machines, or servers, that provide central processing unit (CPU), memory, disk, and network resources for workloads that can be deployed on the host machines. In an enterprise setting, servers, which are also referred to as hosts or host machines, can be acquired at various purchase cycles. The purchase cycles can result in a subset or all hosts in an inventory being replaced because certain servers become obsolete, out of warranty, or otherwise reach end-of-life. Examples of the disclosure can generate recommended plans to acquire replacement host machines for an inventory of host machines that are reaching end of life. The plan can contemplate historical usage of server resources by workloads that are deployed across the host machines and the expected growth or decline in the future demand for server resources by the workloads.

Workloads can include applications and other instructions implemented using a virtual machine. Capacity planning can be effective for a specified planning cycle, which can represent a time period that is relevant to the administrator, the enterprise, or other users. The planning cycle can be monthly, quarterly, yearly, and other time periods. Through a user interface such as an administrative console, a user can generate a purchase plan for an inventor of servers, which can also take into account benchmark data regarding pricing of replacement machines. Therefore, examples of the disclosure provide a personalized purchase plan for candidate replacement host machines based on various criteria, the current inventory of servers, usage of workloads, the resource demands of the workloads, and benchmark data for servers that are available in the marketplace.

Figure 1:
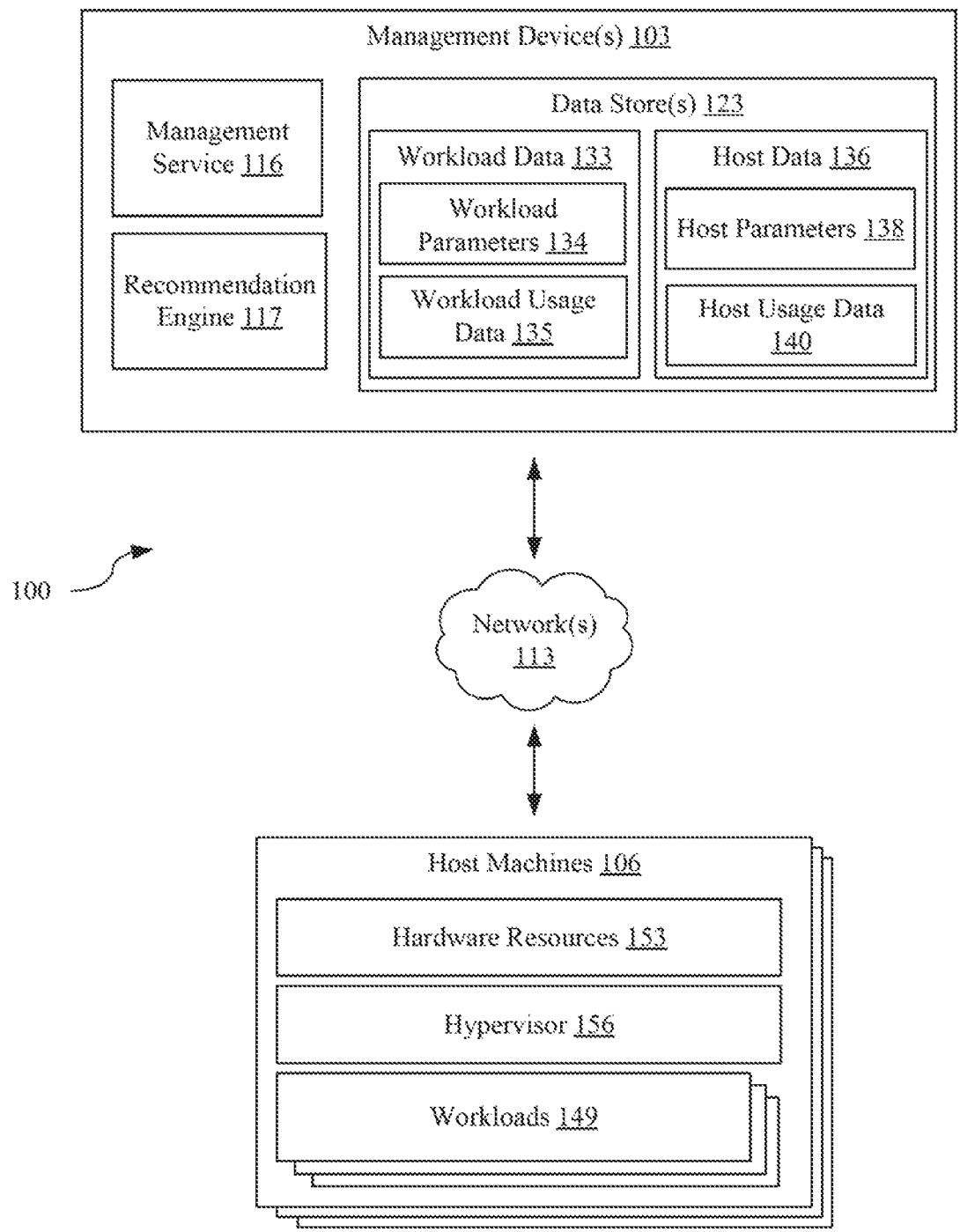
FIG. 1 is a drawing of an example of a networked environment according to various embodiments of the present disclosure.

FIG. 1 depicts a networked environment 100 according to various embodiments. The networked environment 100 includes a management device 103, and one or more host machines 106, which are in data communication with each other via a network 113. The network 113 can include wide area networks (WANs) and local area networks (LANs). These networks 113 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The management device 103 can include a server computer or any other system providing computing capability. In some instances, however, the management device 103 can be representative of a plurality of computing devices used in a distributed computing arrangement, such as a server bank, computer bank, or combination of multiple server banks or computer banks. When using a plurality of computing devices in a distributed computing arrangement, individual management devices 103 may be located in a single installation or may be distributed across multiple installations.

The management device 103 can be configured to execute various applications or components to manage the operation of the host machines 106. For example, the management device 103 can be configured to execute a management service 116, recommendation engine 117, and other applications.

The management service 116 can perform various functions related to the operation of the devices in the networked environment 100. For example, the management service 116 can collect data from the host machines 106 in data communication with the management device 103. Likewise, the management service 116 can configure host machines 106. Similarly, the management service 116 can also send commands to host machines 106 to perform specified actions. Configuration may be performed, or commands may be sent, in response to user input provided through a management console of the management service 116.

The recommendation engine 117 can obtain inputs from the management service 116 and data stored in the data store 123 about host machines, utilization data about workloads deployed across the host machines, and benchmark data regarding servers that are available in the marketplace to act as replacement host machines for the datacenter. The recommendation engine 117 can generate a purchase plan or server recommendations that include a different types and quantities of servers that can be used to replace those servers in a fleet that are due to be replaced.

The management service 116 can provide an administrative interface for configuring the operation of individual components in the networked environment 100. For instance, the management service 116 can provide an administrative interface for the management service 116. As an example, the management service 116 can provide a user interface to allow an administrative user to request a predicted amount of time for a maintenance window that would begin at a user specified time. Accordingly, the management console can correspond to a web page or a web application provided by a web server hosted in the computing environment 100 in some implementations. In other implementations, however, the management console can be implemented as a dedicated or standalone application.

Also, various data can be stored in a data store 123 that is accessible to the management device 103. The data store 123 can be representative of a plurality of data stores 123, which can include relational databases, object-oriented databases, hierarchical databases, hash tables or similar key-value data stores, as well as other data storage applications or data structures. The data stored in the data store 123 is associated with the operation of the various applications or functional entities described below. This data can include the management workload data 133, host data 136 as well as other data not depicted that might be necessary or useful for operation of the management service 116 or recommendation engine 117.

The workload data 133 can include workload parameters 134 and workload usage data 135. The management service 116 can receive a data structure or file from the host machines 106, and workload data 133 can be determined from the data structure. In some cases, the workload parameters 134 can usage data regarding workloads that are deployed on host machines 106 in a datacenter. In those examples, a hypervisor 156 running on a host machine 106 can report workload usage data 135 of a particular workload to the management service 116, which can store the usage data in the data store 123. The usage data can comprise time series data regarding virtual CPU (vCPU) usage, memory usage, network input/output operations, network bandwidth usage, and other metrics are utilizing of the hardware resources of host machines 106 by workloads. Other usage data regarding workloads can include a number vCPUs assigned to a workload, an amount of random access memory (RAM) or other memory parameters, an amount of hard disk space or storage data parameters, a number of network interface controllers (NICs), a required CPU model, a required CPU speed, a CPU reservation, a CPU limit, CPU shares, and memory shares. Network parameters can include a MAC address, an IP address, a subnet mask, and a default gateway.

The workload parameters 134 can include software configuration parameters, hardware resource parameters, network parameters, and other parameters of workloads 149. Software configuration parameters can include a workload identifier (e.g., universal unique identifier UUID), an operating system identifier, a thin provisioning indicator, a fault tolerance indicator, a custom tag value, a management service tag value (e.g. vSphere tag value), a VM template identifier, parent cluster identifier, parent host identifier, parent datacenter identifier, a power state, and a connection state. The management service 116 can use the workload data 133 to determine a CPU demand, a memory demand, a disk space demand, a network demand, and other capacity planning metrics for a workload 149.

The host data 136 can include data collected from or reported by a respective host machine 106 as well as data about the host machine 106 itself. For example, the host data 136 can include host parameters 138, host usage data 140, and potentially other data. The host parameters 138 can include a host identifier, a hypervisor identifier of the hypervisor 156, a list of workloads 149 executed, and hardware resource parameters including an amount of RAM or memory installed, hard disk or data storage installed, a number of physical CPUs, a CPU model, a CPU speed, a number of network interfaces and other values. The hardware resource parameters can represent reported hardware resources 153 of the host machine 106. The host identifier can represent an identifier that uniquely identifies a host machine 106 with respect to other host machines 106. Examples of host identifiers can include serial numbers, media access control (MAC) addresses of network interfaces on the host machine 106, and machine names assigned to the host machine 106. The management service 116 can use the host data 136 to determine a CPU capacity, a memory capacity, a disk space capacity, a network capacity, and other capacity planning metrics for a workload 149. In addition, shortfalls and excesses can also be calculated, for example, based on a difference between capacities and demands.

The host data 136 can also include host usage data 140 that reflects the amount and type of computing resources of the host machine 106 that have been consumed on a historic basis. For example, at periodic intervals (e.g., every minute, every five minutes, every fifteen minutes, every thirty minutes, every hour, etc.), the host machine 106 can report the current resource usage of the host machine 106 capacity to the management service 116. The resource usage can include statistics such as the number of workloads 149 currently hosted by the hypervisor 156 on the host machine 106, the amount of RAM currently committed by the hypervisor 156 for the management of the hosted workloads 149, the current size of a storage cache, the amount of processor cycles currently consumed by the hypervisor 156 or individual workloads 149, and other relevant data.

The host machines 106 can include a server computer or any other system providing computing capability. Often, multiple host machines 106 can be located in a single installation, such as a datacenter. Likewise, host machines 106 located in multiple datacenters may also be in data communication through the network 113 with each other, and with the management device 103.

The host machine 106 can provide an operating environment for one or more workloads 149. Accordingly, a host machine 106 may have a hypervisor 156 installed to manage and coordinate the execution of any workloads 149 hosted by the host machine 106. To assist the operation of the hypervisor 156 or the workloads 149 hosted by the host machine 106, the host machine 106 may also maintain a storage cache.

The hypervisor 156, which may sometimes be referred to as a virtual machine monitor (VMM), is an application or software stack that allows for creating and running virtual machines. Accordingly, a hypervisor 156 can be configured to provide guest operating systems with a virtual operating platform, including virtualized hardware devices or resources, and to manage the execution of guest operating systems within a virtual machine execution space provided on the host machine 106 by the hypervisor 156. In some instances, a hypervisor 156 may be configured to run directly on the hardware of the host machine 106 in order to control and manage the hardware resources of the host machine 106 provided to the workloads 149 resident on the host machine 106. In other instances, the hypervisor 156 can be implemented as an application executed by an operating system executed by the host machine 106, in which case the workload 149 may run as a thread, task, process or virtual machine of the hypervisor 156 or operating system. Examples of different types of hypervisors include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

Although the management device 103 and the host machines 106 are depicted and discussed as separate devices, one or more of these devices could be executed as a workload 149 hosted by another computing device. For example, the functionality provided by the management device 103 could be implemented using a workload 149 executed by a host machine 106 in a datacenter or similar computing environment. Likewise, one or more network storage devices could be implemented as workloads 149 operating on a host machine 106.

Next, a general description of the operation of the various components of the networked environment 100 is provided. The recommendation engine can generate purchase plan recommendations for replacement host machines by analyzing various data sources and identifying a recommended set of replacement host machines based on historical usage of existing host machines 106, workloads 149, and future projected usage of host machines 106 and workloads 149. Although the following description provides one example of the operation of and the interaction between the various components of the networked environment 100, other operations or interactions may occur in various implementations.

A host machine 106 can be registered with the management service 116. For example, an administrative user may use the management service 116 to provide information about the host machine 106 to the management service 116, thereby notifying the management service 116 of the existence of the host machine 106. For example, the administrative user may provide a host identifier to the management service 116. In some instances, the administrative user may also configure the host machine 106 to communicate with the management service 116 using a management console.

The host machine 106 can report relevant usage and configuration data to the management service 116 at periodic intervals. For example, the host machine 106 may report a list of workloads 149 currently executing, as well as a list of applications currently installed and their versions, the current available hardware resources 153, the current resource utilization of the host machine 106, and various other data. As the workloads 149 are reported by the host machines 106 over time, workload usage data 135 and host usage data 140 can be collected.

All of this data can be recorded by the management service 116 in the data store 123 as part of workload data 133 and/or host data 136. After sufficient amounts of information have been collected over a sufficient period of time, the recommendation engine 117 can use various techniques to generate purchase plans for replacement host machines 106 as current host machines 106 in a fleet reach end of life. Information about workload usage, host usage, and purchase plans can then be rendered within the user interface provided by the management service 116 for the benefit of the administrative user.

Figure 2:
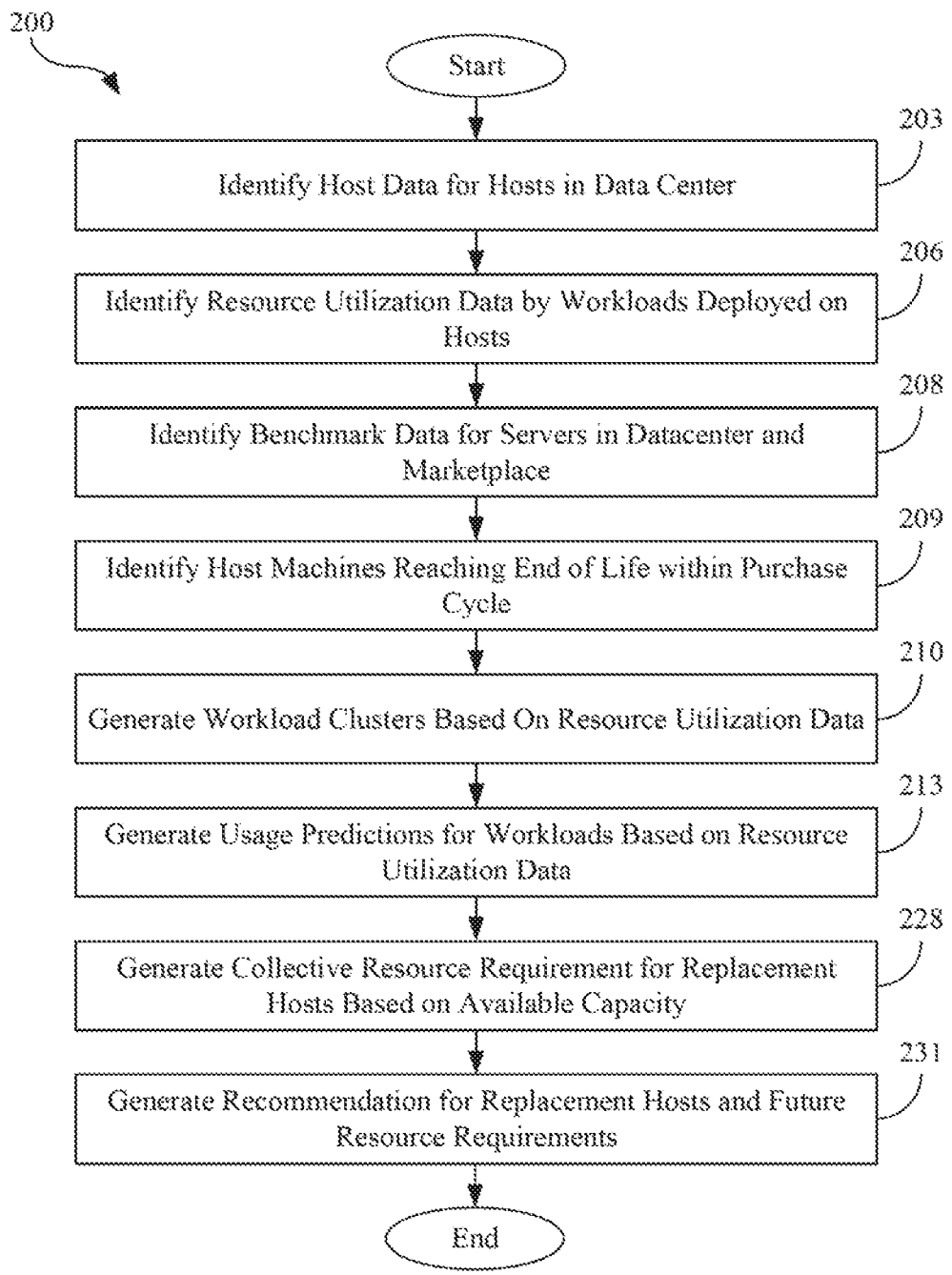
FIG. 2 is an example of a flowchart illustrating functionality implemented by various embodiments of the present disclosure.

Referring next to FIG. 2, shown is a flowchart 200 that provides one example of the operation of a portion of the recommendation engine 117. Generally, the flowchart 200 shows how the recommendation engine 117 can generate a recommendation for replacement hosts machines 106 for a particular datacenter or population of existing host machines 106. The flowchart 200 also depicts a method according to examples of the disclosure. The process shown in flowchart 200 can be initiated periodically when a purchase cycle is nearing, which can represent a time of year in a calendar year, such as annually, quarterly, etc. The process can also be user initiated, such as by an administrator who wishes to view a recommended purchase plan to replace one or more identified host machines 106 in a datacenter fleet.

In one example, the user can identify a beginning date of the purchase cycle, which is when replacement host machines 106 would be acquired for the datacenter. The user can also identify an ending date for the purchase cycle, which is the amount of time that the host machines 106 in the datacenter are expected to be utilized. Accordingly, the process shown in FIG. 2 can generate a recommendation for replacement host machines 106 in the datacenter that are projected to handle the predicted resource utilization by the workloads deployed in the datacenter for the period of time spanning the purchase cycle.

First, at step 203, the recommendation engine 117 can identify host data 136, such as host parameters 138, associated with a population of host machines 106. The host parameters 138 can allow the recommendation engine 117 to identify the type, model, processor count, processor speed, memory amount, memory type, disk parameters, network parameters, and other hardware properties of the host machines 106 in a datacenter. The host parameters 138 can also indicate when a particular host machine 106 will reach its end of life. End of life can be defined by the host machine 106 going out-of-warranty, becoming fully depreciated according to a depreciation model, or becoming obsolete by any other indicator. A host machine 106 in a datacenter fleet should be replaced prior to reaching end of life.

At step 206, the recommendation engine can identify resource utilization data by workloads that are deployed on host machines 106 in the datacenter. In one example, the recommendation engine 117, for each workload that is deployed across the host machines 106, can collect a median value of utilization of a resource by the workload across various time periods. The median value a resource utilization can be, for example, the median vCPU usage of the workload across a time period. The median value of a resource utilization can also be a median memory usage, disk usage, network IOPS, network bandwidth, and other resources of the host machine 106 that are utilized in the time period. The resource utilization data can be time series data across multiple historical time periods for each of the resources of the host machines 106 that are utilized by each workload 149 being considered by the recommendation engine 117.

At step 208, the recommendation engine 117 can identify benchmark data for host machines 106 in the datacenter fleet as well as those servers that are available in the marketplace from various vendors. The benchmark data can be used to calculate a recommended purchase plan for candidate host machines 106 as well as determine when existing host machines 106 are fully depreciated. The benchmark data can include information about the current cost or current value of servers that are in the datacenter and available in the marketplace.

At step 209, the recommendation engine 117 can identify host machines 106 that are reaching end of life within the purchase cycle identified by the user. By identifying the host machines 106 that are reaching end of life, the recommendation engine 117 is also identifying those host machines that are going to be replaced according to the purchase plan recommendation. The recommendation engine 117 can then proceed with an assumption that those servers not reaching end of life during the purchase cycle are not going to be replaced.

In one example, the recommendation engine 117, at step 213, can also identify outdated servers. Hardware, as a general matter, wears out over time. Accordingly, administrators obtain replacement host machines 106 periodically for better efficiency. Moreover, it may not make financial sense as well to spend any maintenance and facilities costs on fully depreciated or end of life servers. There are many ways administrators can track how their assets are getting depreciated over time, such as straight line, max double, etc.

Based on the user chosen depreciation, the recommendation engine 117 can also identify which servers need to be changed in the inventory as a result of reaching end-of-life by the time next purchase cycle comes, so that the future predictions for resource requirements also consider the capacity of such servers. For every server hardware in the inventory, the recommendation engine 117 can calculate a full depreciation date, which is the date at which the calculated server hardware cost after depreciation becomes zero or becomes constant thereafter.

Next, at step 210, the recommendation engine 117 can generate workload clusters based upon the time-series resource utilization data. The recommendation engine 117 can perform an N-dimensional k-Means clustering of the workloads 149 deployed on the host machines, where N is the count of distinct resources assigned by the user across the workloads 149. For example, if the user desires to consider vCPU usage, memory, and disk usage, the clustering can be performed considering those resources.

The number of clusters, or the variable 'k' can be selected using any cluster optimization techniques, such as elbow method, silhouette method, gap statistic method, etc. Alternately, the number of clusters can also be fixed to a certain pre-defined number based on user inputs, such as how many distinct servers or server groups the user desires to be in a recommended purchase plan. Cluster generation is not restricted to a k-means clustering method. Any other supervised or unsupervised clustering algorithm such as G-means clustering can also be utilized.

Next, at step 213, the recommendation engine 117 can generate usage predictions for workloads 149 based upon the resource utilization data identified at step 206. The recommendation engine 117 can generate usage predictions for the workloads deployed on the host machines 106. The recommendation can map the total resource requirements for the workloads in each identified workload cluster until the next purchase cycle. For the identified workload clusters, utilization data collected by the management service 116 is aggregated by median on a periodic basis for every resource in consideration for workloads in the cluster. A time series analysis can be performed using a Holt's forecasting model to obtain the Level and Trend patterns in the resource utilization data. In some cases, using holt-winters forecasting if seasonality consideration is desired. The forecast can have a time horizon until a subsequent server upgrade or purchase cycle of the host machines 106 in the datacenter.

The model is then used to forecast the resource utilization values for workloads 149, grouped by host and/or cluster to obtain resource utilization value until the next purchase cycle. This step can be repeated and summed up for every workload in the cluster to obtain a unified predicted resource utilization for the inventory of the datacenter, at least until the next inventory refresh cycle. The Holt's forecast model can be utilized to generate a forecasted resource requirement for the workloads in the clusters by running a forecast model on the time-series data. The forecasted resource requirement can be resource specific, so a forecast model can be run for each type of resource (e.g., vCPU, memory, network IOPS) for which the administrator tracks metrics for purchasing needs. The metrics can be metrics for which benchmark data is available for servers in the marketplace.

The usage predictions can be generated on a metric-by-metric basis for each type of resource provided by host machines 106. For example, a vCPU prediction can be generated for a particular cluster, as can a memory usage prediction, disk usage prediction, network bandwidth prediction, network IOPS prediction, etc., for the cluster. Additionally, for each resource provided by the host machines 106, the recommendation engine 117 can calculate an amount of each type of resource provided by the servers that are identified as end of life and undergoing replacement. In effect, the resource capacity for each resource of the servers undergoing replacement can be distributed among all clusters according to a ratio of the forecasted resource requirement for the clusters. The resources corresponding to the end-of-life servers is therefore calculated.

At step 228, a collective resource requirement for replacement host machines 106 can be calculated based on the available capacity within the datacenter fleet. The collective resource requirement can be based upon the usage predictions generated at step 213 and the resource capacity of the end-of-life servers that are being replaced in the fleet. For each resource of a host machine 106, the recommendation engine 117 can generate a resource capacity of target servers for each metric or resource based upon the usage prediction. The forecasted resource requirements represent how much capacity for the various hardware metrics are required by the end of the next purchase cycle or until the replacement machines 106 reach end of life. The collective resource requirement is the minimum amount of resource capacity that should be available in the fleet of replacement host machines 106. The collective resource requirement is calculated by summing the forecasted resource requirement with the resource capacity lost by the end-of-life servers and a headroom requirement. The collective resource requirement can be calculated for each resource metric. The headroom requirement can be user-configurable parameter to add excess capacity above the calculated resource capacity for a particular resource metric.

At step 231, the recommendation engine 117 can generate a recommendation for replacement host machines 106 and a projection for future resource requirements. The recommendations can be for both future requirements coming out of outdated servers and future resource projections. The total resource requirements for each workload cluster obtained above can be mapped to a best suited server from the benchmark data on servers in the marketplace that is accessible to the recommendation engine 117. The recommendation engine 117 can also implement a usage mapper that utilizes collated data of the various servers in the industry along with their costs. For each workload group, the recommendation engine 117 can obtain an average of the ratio of the resource projections for a resource. This signifies that on full utilization, the resource consumption by all the workloads in the cluster will be typically in this ratio. If the servers running the workloads are having a resource capacity ratio similar to this ratio, it means that the resource wastage will be minimized and result in improved performance.

For example, suppose vCPU, memory, and disk projections for a workload cluster are 100 vCPU, 300 GB and 2 TB disk, respectively. The resultant ratio is 50:150:1, implying that workloads in the cluster will typically require 50 vCPUs and 150 GB of collective ram for every 1 TB of persistent storage required. This ratio captures the workload requirements for this workload group with a single measure, and the recommendation engine 117 can utilize this ratio to recommend a server having resource capacities in a similar ratio. Because other workload groups will have a different set of ratios and requirements, they will be provided with a separate server recommendation.

Accordingly, the recommendation engine 117 can obtain the ratio of resource projections to one another. The recommendation engine 117 can query benchmark data for information about available servers in the marketplace. The recommendation engine 117 can filter servers which have the different resources that are required by workloads according to the calculated projections.

The identified servers can be sorted according to their respective launch dates and filtered according to a recency parameter (e.g., 2 years). In this example, servers older than the recency parameter are filtered out so that depreciation and servers nearing end of life are not recommended. For each server, the recommendation engine 117 can obtain the ratio of its resource capacity parameters to one another, similar to the ratio generated for the resource projections to one another. Among the servers having similar ratios of resource capacity parameters as the resource projection ratio, the recommendation engine 117 can identify the server having the closest such ratios and lowest cost. The process can be repeated for each cluster of workloads. Thereafter, the process proceeds to completion.

Figure 3:
FIG. 3 is an example of a user interface rendered by components of the networked environment according to various embodiments of the present disclosure.

FIG. 3 depicts an example of a user interface 300 generated by the management service 116. As illustrated, the user interface 300 can allow a user to generate purchase plan recommendations created by the recommendation engine 117. The user can select a beginning date and an ending date of the purchase cycle. Based upon the beginning date and ending date, the recommendation engine 117 can identify servers in the datacenter that are going end of life during the selected time period. The servers going end of life during the selected time period are those for which replacement host machines 106 are identified. Additionally, the user interface 300 allows the user to filter purchase plan recommendations by server vendors.

Figure 4:
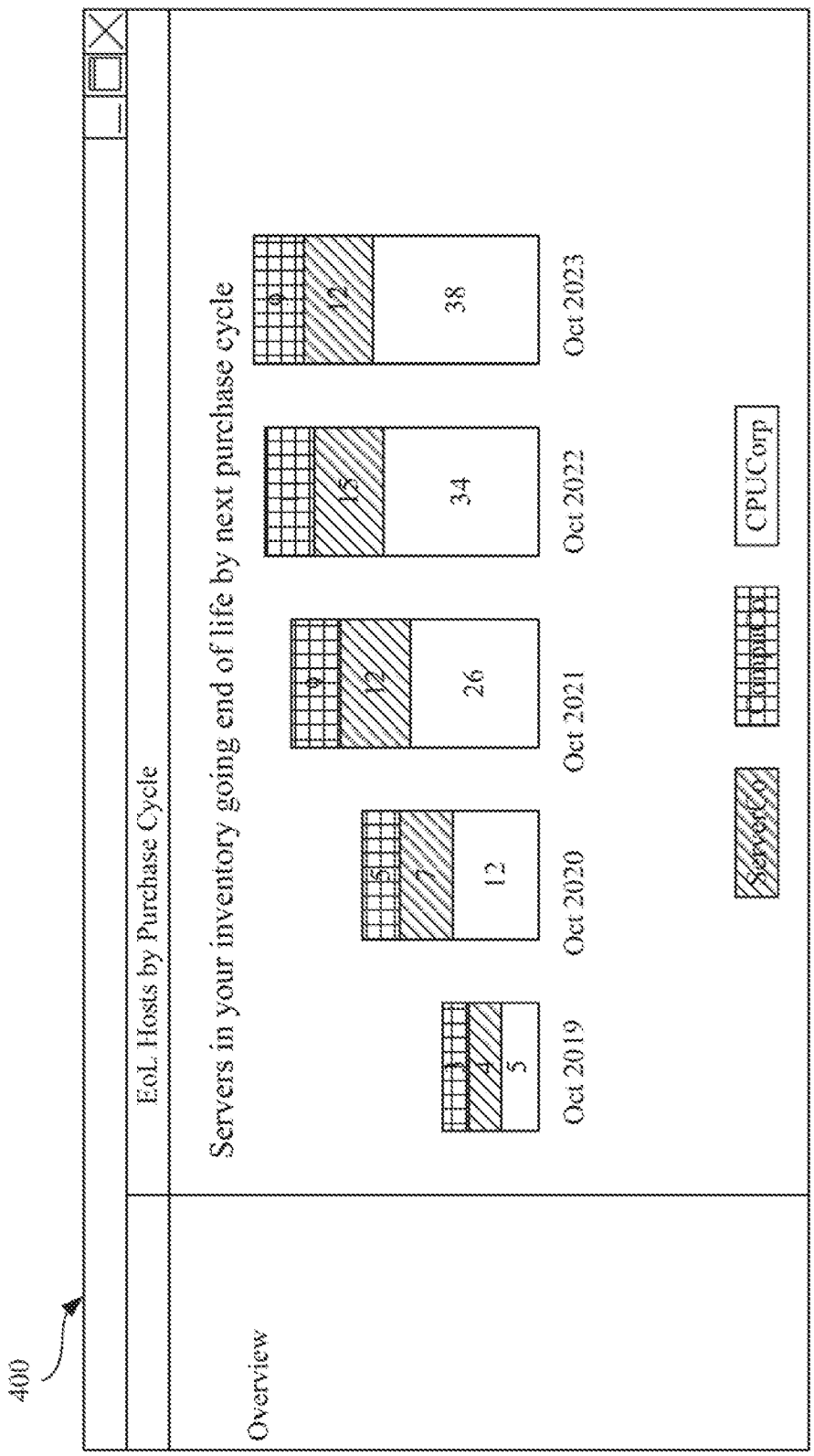
FIG. 4 is an example of a user interface rendered by components of the networked environment according to various embodiments of the present disclosure.

FIG. 4 depicts an example of a user interface 400 generated by the management service 116. As illustrated, the user interface 400 can include an area in which a user can visualize information about a fleet of host machines 106 in a datacenter that are nearing end of life. At this example user interface, the administrator can visualize the scope of the purchase cycles that he or she has defined for the datacenter and visualize how many servers might be needed in a given purchase cycle based upon the current fleet. In some examples, the subsequent purchase cycles may have fewer servers that are going end of life that earlier purchase cycles. Additionally, the user interface 400 can also be generated assuming that end of life servers are replaced at each purchase cycle so that subsequent purchase cycles do not indicate servers that are assumed to have been replaced.

User can provide the dates for purchase cycles so that the recommendation engine can appropriately calculate the future projections, servers getting outdated, etc. Users can be expected to run these recommendations as close to the purchase as possible, so that most current servers in the marketplace are shown. If a user has any vendor affinity, the user can also include or exclude certain vendors or brands that are shown so that recommendations are from selected vendors only.

Figure 5:
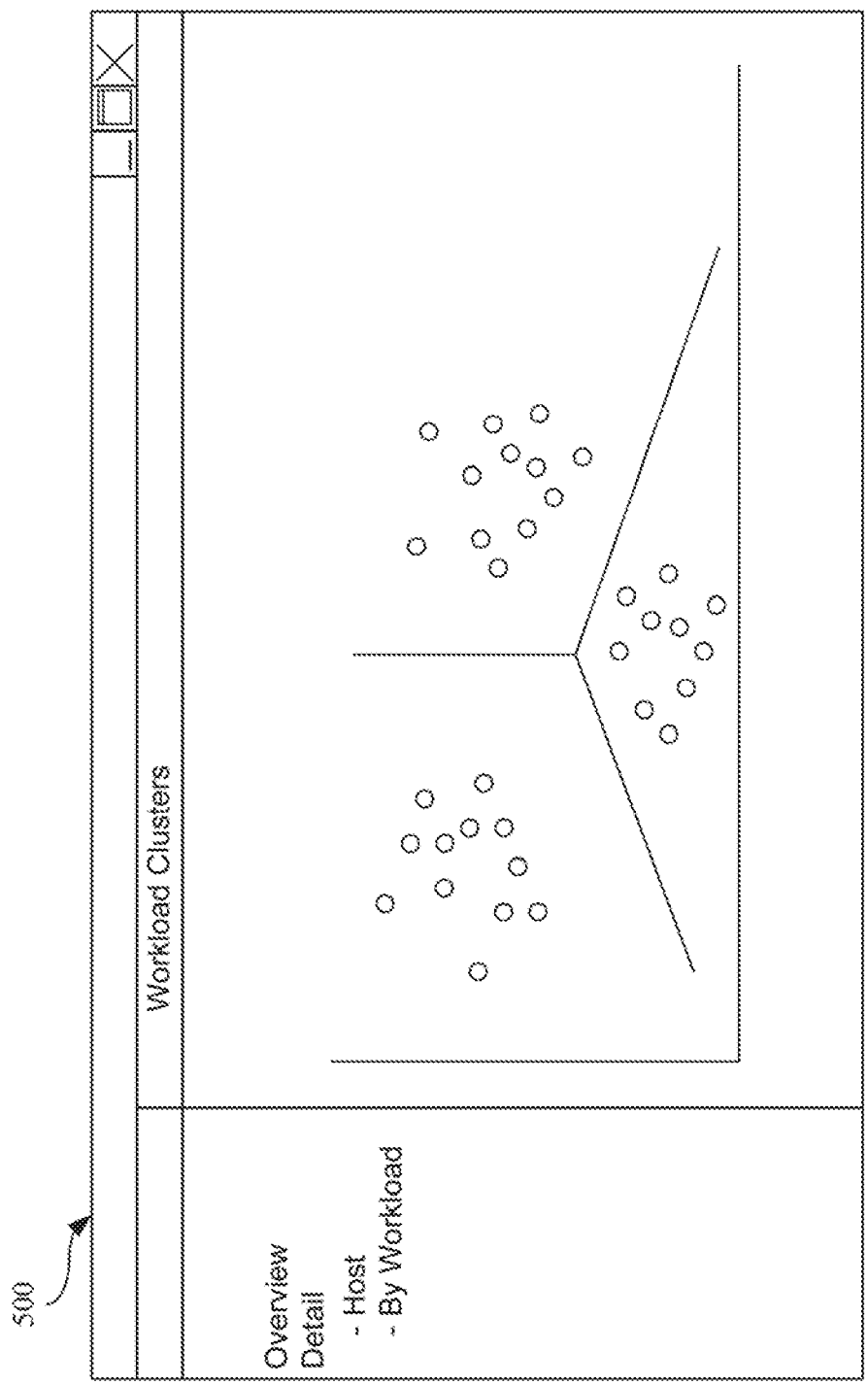
FIG. 5 is an example of a user interface rendered by components of the networked environment according to various embodiments of the present disclosure.

Once a user generates and selects purchase configurations for a purchase plan, the management service 116 or recommendation engine 117 can provide users details in the form of multiple reports, such as Server Modernization Opportunities, vCPU usage, memory usage, trends by month or other data not shown. In some examples, the user interfaces generated by the management service 116 can also provide the users an insight about the resource usage patterns and trends in workload clusters. The management service 116 can also show the projected values of resource usage until the next purchase cycle entered by the user, which can help users decide on the purchases in an upcoming purchase cycle FIG. 5 depicts an example of a user interface 500 generated by the management service 116. FIG. 5 illustrates how the user interface 500 can show workload clusters identified by the recommendation engine 117. In some examples, the user can select one or more of the workloads, and the management service 116 can provide the details of the different workload groups identified by the recommendation engine 117 to provide more detailed insights about the workloads, and the reason why a particular server was recommended for a workload cluster.

Figure 6:
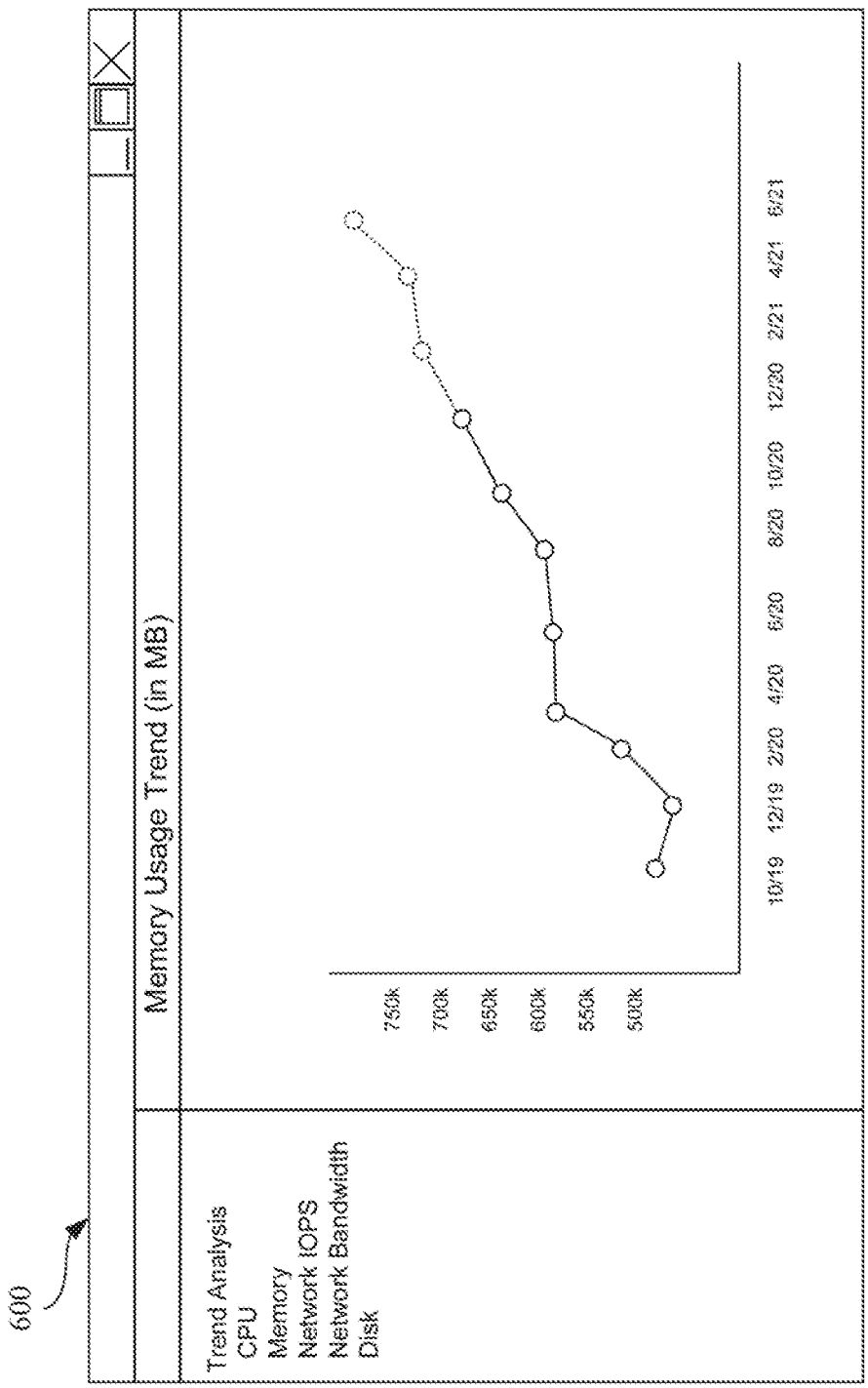
FIG. 6 is an example of a user interface rendered by components of the networked environment according to various embodiments of the present disclosure.

FIG. 6 depicts an example of a user interface 600 generated by the management service 116. FIG. 6 illustrates how the user interface 600 can show resource usage trends for the fleet of servers in the datacenter. In some examples, the user interface can show resource usage trends clusters. In some examples, the user interface 600 can also illustrate usage predictions generated by the recommendation engine 117.

Figure 7:
FIG. 7 is an example of a user interface rendered by components of the networked environment according to various embodiments of the present disclosure.

FIG. 7 depicts an example of a user interface 700 generated by the management service 116. FIG. 7 illustrates how the user interface 700 can present purchase plan recommendation generated by the recommendations for workload clusters that are also identified by the recommendation engine 117. The user interface 700 can show the recommended server hardware model, CPU, memory, RAM, price, quantity, etc., and other server details for each workload cluster. Users can also be provided with an option to customize the purchase plan by selecting the number of servers they need to purchase, or the user can generate their own custom plans apart from the recommended purchase plan by selecting the servers available in the market. In some implementations, the user is provided with an option to save the purchase plan recommendation, which provides the user with flexibility to save, export, or share the recommendation or utilize the recommendation in other systems.

Several software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 116, hypervisor 156, other services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of several technologies. These technologies can include discrete logic circuits having logic gates for implementing various logic functions on an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or several interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable mediums include solid-state drives or flash memory. Further, any logic or application described herein, can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system comprising:
   at least one computing device comprising at least one processor and at least one data store:
   machine readable instructions stored in the at least one data store, wherein the instructions, when executed by the at least one processor, cause the at least one computing device to at least:

identify host data for a plurality of host machines in a data center, the host data identifying the host machines comprising the data center, the host data further identifying end-of-life information associated with respective ones of the plurality of host machines;

identify resource utilization data associated with the plurality of host machines, the resource utilization data comprising time series data identifying resource utilization by a plurality of workloads deployed across the host machines;

generate a plurality of clusters of workloads based upon the resource utilization data, the clusters generated by clustering workloads that are similar to each other based upon the utilization data;

generate respective usage predictions for the workloads based upon the resource utilization data;

generate a forecasted resource requirement for the clusters based upon the respective usage predictions, the forecasted resource requirement having a time horizon until a subsequent server upgrade;

generate a collective resource requirement for a plurality of replacement host machines based upon the forecasted resource requirement and the respective usage predictions;

identify benchmark data for a plurality of candidate replacement host machines to replace one or more of the host machines, the benchmark data comprising computing capabilities and a cost of respective candidate host machines;

generate a recommendation for the plurality of replacement host machines based upon the benchmark data and the collective resource requirement; and cause the at least one computing device to at least map the workloads to respective one of the replacement host machines by identifying replacement host machine having a first ratio of resource parameters closest to a second ratio of the resource parameters defined by the respective usage prediction of the workloads.

2. The system of claim 1, wherein the resource utilization data is identified by identifying at least one of a plurality of resource metrics, wherein the plurality of resource metrics are at least one of: a virtual central processing unit (vCPU) usage, a memory usage, a network input/output operations per second (IOPS), a network bandwidth usage, or a disk usage associated with the plurality of workloads deployed on the plurality of host machines.

3. The system of claim 2, wherein the plurality of clusters of workloads are generated by identifying a respective median value of a plurality of resource metrics associated with respective ones of the workloads the clustering the workloads deployed on the host machines by the respective median values.

4. The system of claim 3, wherein the clusters of workloads are generated by performing an unsupervised clustering algorithm on the respective median values of the plurality of resource metrics.

5. The system of claim 1, wherein the respective usage predictions for the clusters are generated by performing a Holt's Forecasting model, wherein a first input into the model comprises the time-series data and a second input into the model comprises an expected time period of deployment of the replacement host machines.

6. The system of claim 5, wherein the respective usage predictions further comprises a headroom parameter that increases the respective usage predictions beyond a usage forecasted by the model.

7. A method comprising:
identifying host data for a plurality of host machines in a data center, the host data identifying the host machines comprising the data center, the host data further identifying end-of-life information associated with respective ones of the plurality of host machines;

identifying resource utilization data associated with the plurality of host machines, the resource utilization data comprising time series data identifying resource utilization by a plurality of workloads deployed across the host machines;

generating a plurality of clusters of workloads based upon the resource utilization data, the clusters generated by clustering workloads that are similar to each other based upon the utilization data;

generating respective usage predictions for the workloads based upon the resource utilization data;

generating a forecasted resource requirement for the clusters based upon the respective usage predictions the forecasted resource requirement having a time horizon until a subsequent server upgrade;

generating a collective resource requirement for a plurality of replacement host machines based upon the forecasted resource requirement and the respective usage predictions;

identifying benchmark data for a plurality of candidate replacement host machines to replace one or more of the host machines, the benchmark data comprising computing capabilities and a cost of respective candidate host machines;

generating a recommendation for the plurality of replacement host machines based upon the benchmark data and the collective resource requirement; and causing the at least one computing device to at least map the workloads to respective one of the replacement host machines by identifying replacement host machine having a first ratio of resource parameters closest to a second ratio of the resource parameters defined by the respective usage prediction of the workloads.

8. The method of claim 7, wherein the resource utilization data is identified by identifying at least one of a plurality of resource metrics, wherein the plurality of resource metrics are at least one of: a virtual central processing unit (vCPU) usage, a memory usage, a network input/output operations per second (IOPS), a network bandwidth usage, or a disk usage associated with the plurality of workloads deployed on the plurality of host machines.

9. The method of claim 8, wherein the plurality of clusters of workloads are generated by identifying a respective median value of a plurality of resource metrics associated with respective ones of the workloads the clustering the workloads deployed on the host machines by the respective median values.

10. The method of claim 9, wherein the clusters of workloads are generated by performing an unsupervised clustering algorithm on the respective median values of the plurality of resource metrics.

11. The method of claim 7, wherein the respective usage predictions for the clusters are generated by performing a Holt's Forecasting model, wherein a first input into the model comprises the time-series data and a second input into the model comprises an expected time period of deployment of the replacement host machines.

12. The method of claim 11, wherein the respective usage predictions further comprises a headroom parameter that increases the respective usage predictions beyond a usage forecasted by the model.

13. A non-transitory computer-readable medium comprising machine readable instructions, wherein the instructions, when executed by at least one processor, cause at least one computing device to at least:

identify host data for a plurality of host machines in a data center, the host data identifying the host machines comprising the data center, the host data further identifying end-of-life information associated with respective ones of the plurality of host machines;

identify resource utilization data associated with the plurality of host machines, the resource utilization data comprising time series data identifying resource utilization by a plurality of workloads deployed across the host machines;

generate a plurality of clusters of workloads based upon the resource utilization data, the clusters generated by clustering workloads that are similar to each other based upon the utilization data;

generate respective usage predictions for the workloads based upon the resource utilization data;

generate a forecasted resource requirement for the clusters based upon the respective usage predictions, the forecasted resource requirement having a time horizon until a subsequent server upgrade;

generate a collective resource requirement for a plurality of replacement host machines based upon the forecasted resource requirement and the respective usage predictions;

identify benchmark data for a plurality of candidate replacement host machines to replace one or more of the host machines, the benchmark data comprising computing capabilities and a cost of respective candidate host machines;

generate a recommendation for the plurality of replacement host machines based upon the benchmark data and the collective resource requirement; and cause the at least one computing device to at least map the workloads to respective one of the replacement host machines by identifying replacement host machine having a first ratio of resource parameters closest to a second ratio of the resource parameters defined by the respective usage prediction of the workloads.

14. The non-transitory computer-readable medium of claim 13, wherein the resource utilization data is identified by identifying at least one of a plurality of resource metrics, wherein the plurality of resource metrics are at least one of: a virtual central processing unit (vCPU) usage, a memory usage, a network input/output operations per second (IOPS), a network bandwidth usage, or a disk usage associated with the plurality of workloads deployed on the plurality of host machines.

15. The non-transitory computer-readable medium of claim 14, wherein the plurality of clusters of workloads are generated by identifying a respective median value of a plurality of resource metrics associated with respective ones of the workloads the clustering the workloads deployed on the host machines by the respective median values.

16. The non-transitory computer-readable medium of claim 15, wherein the clusters of workloads are generated by performing an unsupervised clustering algorithm on the respective median values of the plurality of resource metrics.

17. The non-transitory computer-readable medium of claim 13, wherein the respective usage predictions for the clusters are generated by performing a Holt's Forecasting model, wherein a first input into the model comprises the time-series data and a second input into the model comprises an expected time period of deployment of the replacement host machines.

18. The non-transitory computer-readable medium of claim 17, wherein the respective usage predictions further comprises a headroom parameter that increases the respective usage predictions beyond a usage forecasted by the model.

\* \* \* \* \*